US008027297B2

(12) United States Patent
Kim et al.

(10) Patent No.: US 8,027,297 B2
(45) Date of Patent: Sep. 27, 2011

(54) METHOD FOR TRANSMITTING DOWNLINK CONTROL SIGNAL

(75) Inventors: Hak Seong Kim, Gyeonggi-do (KR); Sung Duk Choi, Gyeonggi-do (KR); Ki Jun Kim, Gyeonggi-do (KR); Suk Hyon Yoon, Gyeonggi-do (KR); Joon Kui Ahn, Gyeonggi-do (KR); Bong Hoe Kim, Gyeonggi-do (KR); Dong Youn Seo, Gyeonggi-do (KR); Young Woo Yun, Gyeonggi-do (KR); Seong Hoon Jeong, Gyeonggi-do (KR); Eun Sun Kim, Gyeonggi-do (KR); Dae Won Lee, Gyeonggi-do (KR); Jung Hoon Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/444,104

(22) PCT Filed: Oct. 2, 2007

(86) PCT No.: PCT/KR2007/004824
§ 371 (c)(1),
(2), (4) Date: Apr. 2, 2009

(87) PCT Pub. No.: WO2008/041819
PCT Pub. Date: Apr. 10, 2008

(65) Prior Publication Data
US 2010/0098020 A1 Apr. 22, 2010

Related U.S. Application Data

(60) Provisional application No. 60/827,852, filed on Oct. 2, 2006, provisional application No. 60/943,783, filed on Jun. 13, 2007.

(30) Foreign Application Priority Data

Jan. 3, 2007 (KR) .................. 10-2007-0000526
Jan. 9, 2007 (KR) .................. 10-2007-0002476
Oct. 2, 2007 (KR) .................. 10-2007-0099054

(51) Int. Cl.
*H04W 4/00* (2009.01)
(52) U.S. Cl. .................. 370/329; 370/343; 370/480
(58) Field of Classification Search .................. 370/235, 370/329, 330, 343, 344, 350, 480, 481, 503, 370/913; 455/450, 509
See application file for complete search history.

(56) References Cited

U.S. PATENT DOCUMENTS
5,870,391 A * 2/1999 Nago .................. 370/330
(Continued)

FOREIGN PATENT DOCUMENTS
EP   1185001   3/2002
(Continued)

OTHER PUBLICATIONS

Ryu, H.G., "System Design and Analysis of MIMO SFBC CI-OFDM System against the Nonlinear Distortion and Narrowband Interference," IEEE Transactions on Consumer Electronics, vol. 54, No. 2, pp. 368-375, May 2008.

(Continued)

*Primary Examiner* — Andrew Lai
(74) *Attorney, Agent, or Firm* — Lee, Hong, Degerman, Kang & Waimey

(57) ABSTRACT

A method of transmitting a downlink control signal is disclosed, by which localized allocation and distributed allocation are efficiently used in transmitting a downlink control signal. The present invention includes multiplexing the downlink control signal in a manner of if there exists downlink data transmission to a prescribed UE, applying localized allocation to a transmission of the downlink control signal including the scheduling information on the uplink data transmission of the UE and applying distributed allocation to another transmission of the downlink control signal and transmitting the multiplexed downlink control signal.

13 Claims, 7 Drawing Sheets

U.S. PATENT DOCUMENTS

| | | | |
|---|---|---|---|
| 6,452,936 B1 * | 9/2002 | Shiino | 370/441 |
| 7,315,577 B2 | 1/2008 | Shao | |
| 7,336,633 B2 * | 2/2008 | Kruys | 370/330 |
| 7,386,076 B2 | 6/2008 | Onggosanusi et al. | |
| 2001/0005681 A1 | 6/2001 | Kim | |
| 2001/0034236 A1 | 10/2001 | Tong et al. | |
| 2003/0039227 A1 | 2/2003 | Kwak | |
| 2003/0133426 A1 | 7/2003 | Schein et al. | |
| 2004/0009780 A1 | 1/2004 | Dick et al. | |
| 2004/0081131 A1 | 4/2004 | Walton et al. | |
| 2004/0190640 A1 | 9/2004 | Dubuc et al. | |
| 2005/0083977 A1 * | 4/2005 | Moulsley et al. | 370/913 |
| 2005/0117536 A1 | 6/2005 | Cho et al. | |
| 2005/0122898 A1 | 6/2005 | Jang et al. | |
| 2005/0220000 A1 | 10/2005 | Kim et al. | |
| 2005/0232181 A1 | 10/2005 | Park et al. | |
| 2005/0233754 A1 | 10/2005 | Beale | |
| 2006/0045001 A1 | 3/2006 | Jalali | |
| 2006/0198294 A1 | 9/2006 | Gerlach | |
| 2006/0209814 A1 | 9/2006 | Fujii | |
| 2006/0250941 A1 | 11/2006 | Onggosanusi et al. | |
| 2006/0264218 A1 * | 11/2006 | Zhang et al. | 455/450 |
| 2007/0110104 A1 | 5/2007 | Sartori et al. | |
| 2007/0149137 A1 * | 6/2007 | Richardson et al. | 455/68 |
| 2007/0183533 A1 | 8/2007 | Schmidl et al. | |
| 2007/0184849 A1 | 8/2007 | Zheng | |
| 2007/0206559 A1 | 9/2007 | Cho et al. | |
| 2007/0258373 A1 * | 11/2007 | Frederiksen et al. | 370/235 |
| 2007/0258540 A1 | 11/2007 | Ratasuk et al. | |
| 2008/0025247 A1 | 1/2008 | McBeath et al. | |
| 2008/0253469 A1 | 10/2008 | Ma et al. | |
| 2008/0310483 A1 | 12/2008 | Lee et al. | |
| 2009/0060081 A1 | 3/2009 | Zhang et al. | |
| 2009/0154580 A1 | 6/2009 | Ahn et al. | |
| 2009/0196279 A1 | 8/2009 | Kim et al. | |
| 2009/0274037 A1 | 11/2009 | Lee et al. | |
| 2009/0285163 A1 | 11/2009 | Zhang et al. | |
| 2009/0310719 A1 | 12/2009 | Stirling-gallacher | |
| 2009/0323615 A1 | 12/2009 | Ihm et al. | |
| 2010/0034163 A1 | 2/2010 | Damnjanovic et al. | |
| 2010/0260164 A1 | 10/2010 | Moon et al. | |

FOREIGN PATENT DOCUMENTS

| | | |
|---|---|---|
| EP | 1248485 | 10/2002 |
| EP | 1746810 | 1/2007 |
| EP | 1746855 | 1/2007 |
| JP | 2004-312291 A | 11/2004 |
| JP | 2007-124682 A | 5/2007 |
| KR | 101999013366 | 2/1999 |
| KR | 10-2002-0009079 A | 2/2002 |
| KR | 1020020088085 | 11/2002 |
| KR | 1020020088085 A | 11/2002 |
| KR | 1020030081464 | 10/2003 |
| KR | 1020030081464 A | 10/2003 |
| KR | 1020050021965 | 3/2005 |
| KR | 10-2005-0043302 A | 5/2005 |
| KR | 1020050073256 | 7/2005 |
| KR | 10-2005-0120244 A | 12/2005 |
| KR | 1020060016600 | 2/2006 |
| KR | 10-2006-0081352 A | 7/2006 |
| KR | 10-2006-0092055 A | 8/2006 |
| KR | 1020060095576 | 8/2006 |
| KR | 1020070107614 | 11/2007 |
| KR | 1020080023664 | 3/2008 |
| KR | 1020080030905 | 4/2008 |
| KR | 1020080039772 | 5/2008 |
| KR | 1020080065853 | 7/2008 |
| KR | 1020080096088 | 10/2008 |
| KR | 100894142 | 4/2009 |
| KR | 1020090082843 | 7/2009 |
| RU | 2142672 | 10/1999 |
| RU | 2221335 | 1/2004 |
| WO | 03/043245 A1 | 5/2003 |
| WO | 03/077579 | 9/2003 |
| WO | 2004/038991 | 5/2004 |
| WO | 2004/049591 | 6/2004 |
| WO | 2005/006250 | 1/2005 |
| WO | 2005/060132 | 6/2005 |
| WO | 2005/065062 | 7/2005 |
| WO | 2005/074184 A2 | 8/2005 |
| WO | 2005099123 | 10/2005 |
| WO | 2005/125140 A1 | 12/2005 |
| WO | 2005119959 | 12/2005 |
| WO | 2006/023192 A2 | 3/2006 |
| WO | 2006/073284 | 7/2006 |
| WO | 2006/102771 | 10/2006 |
| WO | 2007/052941 A1 | 5/2007 |
| WO | 2007049208 | 5/2007 |

OTHER PUBLICATIONS

Ryu, H.G., et al., "Design and Performance Evaluation of the MIMO SFBC CI-OFDM Communication System," The Fourth International Conference on Wireless and Mobile Communications, pp. 60-64, Jul. 2008.

Panasonic, "Mapping Positions of Control Channel for Uplink SC-FDMA", TSG-RAN WG1 #43, Doc. No. R1-051395, XP-002450961, Nov. 7, 2005.

3rd Generation Partnership Project (3GPP), "3rd Generation Partnership Project; Technical Specification Group Radio Access Network; LTE Physical Layer—General Description (Release 8)" 3GPP TS 36.201 V1.2.0, XP-050380347, Jun. 2007.

Zhang, W., et al., "Universal Space-Frequency Block Coding for MIMO-OFDM Systems", IEEE Asia-Pacific Conference on Communications, pp. 227-231, Oct. 5, 2005.

Zhang, M., et al., "Space-Frequency Block Code with Matched Rotation MIMO-OFDM System with Limited Feedback", EURASIP Journal on Advances in Signal Processing, Jun. 24, 2009.

Su, W., et al., "Obtaining full-diversity space-frequency codes from space-time codes via mapping," IEEE Transactions on Signal Processing, vol. 51, No. 11, pp. 2903-2916, Nov. 1, 2003; XP-011102805.

Samsung, "Transmit Diversity for 4-Tx Antenna", 3GPP TSG RAN WG1 Meeting #49, R1-072238, May 7, 2007, XP-002578959.

Zhang, W., et al., "Space-Time/Frequency Coding for MIMO-OFDM in Next Generation Broadband Wireless Systems," Next-Generation CDMA vs. OFDMA for 4G Wireless Applications, IEEE Wireless Communications, vol. 14, No. 3, pp. 32-43, Jun. 2007, XP-011189164.

Kim, I.G., et al., "Transmit Diversity and Multiplexing Methods for 3G-LTE Downlink Control Channels," 64th IEEE Vehicular Technology Conference, Sep. 2006, XP-031051218.

* cited by examiner 1 subcarrier

▦ control signal to UE1  ▨ control signal to UE2
▧ data to UE1  ▨ control signal to UE3

▦ pilot signal  ▨ boradcasting # of distributed scheduling signals
▧ distributed scheduling signals
▨ localized scheduling signal to UE1  ▧ data to UE1

16QAM, r=1/2

QPSK, r=1/2

QPSK, r=1/4 frequency

UE1 may try decoding these areas

UE2 may try decoding these areas scheduling signal to UE1
 scheduling signal to UE2
scheduling signals to other UEs

METHOD FOR TRANSMITTING DOWNLINK CONTROL SIGNAL

CROSS-REFERENCE TO RELATED APPLICATIONS

This application is a 371 U.S. national stage application of international application PCT/KR2007/004824, filed on Oct. 2, 2007, which claims priority to Korean patent applications 10-2007-0000526, filed on Jan. 3, 2007, 10-2007-0002476, filed on Jan. 9, 2007, and 10-2007-0099054, filed on Oct. 2, 2007, and U.S. provisional applications 60/827,852, filed on Oct. 2, 2006 and 60/943,783, filed on Jun. 13, 2007, the contents of which are hereby incorporated by reference herein in their entirety.

TECHNICAL FIELD

The present invention relates to a multi-carrier mobile communication system, and more particularly, to a structure of a downlink control signal and a method of transmitting the same. Although the present invention is suitable for a wide scope of applications, it is particularly suitable for transmitting a downlink control signal required for uplink/downlink data transmission more efficiently.

BACKGROUND ART

Generally, in a multi-carrier mobile communication system, a base station transmits downlink data packets to user equipments (UEs) belonging to each of at least one or more cells.

A plurality of user equipments can exist within a cell. Each of the user equipments is incapable of knowing when a data packet will be received or what kind of data packet will be received. So, when a base station transmits a downlink data packet to a specific user equipment (hereinafter abbreviated UE), such necessary information as an identification (ID) of the UE to receive the corresponding data packet, a time-frequency domain for transmitting the data packet, a data transport format including coding rate, modulation scheme and the like, HARQ associated information, and the like should be transmitted in downlink for each downlink data packet transmission.

On the contrary, in order to enable a USE to transmit such necessary information as a data packet in uplink, a base station should transmit ID of a UE to be allowed for data packet transmission, uplink time-frequency domain for the UE to transmit the data packet, data transport format including coding rate, modulation scheme and the like, HARQ associated information, and the like in downlink for each uplink data packet transmission.

In case of uplink data packet transmission, a base station should transmit acknowledgement/non-acknowledgement (ACK/NAK) information on each packet transmitted by a UE to the corresponding UE in downlink. Moreover, the base station should transmit power control information to each UE in downlink to sustain uplink transmission/reception power of the corresponding UE at a proper level.

For convenience of explanation, in the following description, every information transferred via physical layers for data transmission and reception between base station and UE is called 'downlink control information'. And, a signal for carrying this information is called 'downlink control signal'.

In detail, downlink control information can be categorized as follows.

1. Scheduling Information on Uplink/Downlink Data
   (1) Category-A Information: ID of UE to transmit/receive data packets, allocation information on frequency-time domain for carrying data packets, etc.
   (2) Category-B Information: Data transport format such as coding rate, modulation scheme and the like, HARQ associated information, etc.
2. Information Not Associated with Downlink Data
   (1) ACK/NAK Information, Power Control Information, etc.

In order to operate a system efficiently, it is necessary to efficiently multiplex a downlink control signal for carrying the above-mentioned control informations with data packets and other downlink signals in downlink time-frequency resources.

For this, a general downlink signal transmitting system is explained as follows.

First of all, a downlink data packet transmitting system can be mainly categorized into localized allocation and distributed allocation.

In the localized allocation, data for a single UE are transmitted within a relatively restricted frequency banc via consecutive subcarriers. A base station scheduler selects a band having a good radio channel frequency response for each UE based on a frequency response reported by UEs within a cell on a downlink radio channel and then transmits data. Hence, cell transmission efficiency can be raised. For reference, in the localized allocation, a base station is able to transmit data to a single UE via subcarriers within at least two bands discontinuous on frequency if necessary.

In the distributed allocation, data for a single UE is transmitted via a relatively wide frequency band within a system band by being intentionally distributed. The distributed allocation is available for a case that a base station scheduler has difficulty in estimating a downlink radio channel frequency response for UE or applying a frequency response to downlink data packet scheduling. Since a single data packet is transmitted via wide frequency band, frequency diversity gain is obtained. Hence, data packet receiving performance can be enhanced.

In the following description, a downlink signal transmitting system supports both localized allocation and distributed allocation for downlink data packet transmission. And, it is assumed that data packets transmitted differently within a single transmission time can be multiplexed together.

For clarity of the following description, a basic time-frequency domain unit for data packet transmission is named a resource block (hereinafter abbreviated RB). And, it is assumed that a single RB includes a plurality of subcarrier areas across a plurality of OFDM symbols.

FIG. 1 is a diagram of a structure for transmitting a downlink signal by localized allocation.

Referring to FIG. 1, if 288 subcarriers used for downlink data transmission exist within a system band and if a single RB includes 12 subcarriers through 6 OFDM symbols, 24 RBs exist for every 6 OFDM symbols in downlink. In this case, assuming that RB for localized allocation is generally named LVRB (localized virtual RB), the LVRB, as shown in FIG. 1, is constructed with 12 consecutive subcarriers. Looking into an example that LVRBs are allocated to a UE1 in FIG. 1, localized allocation can be implemented in a manner of transmitting data via LVRBs consecutive for a single UE.

Moreover, looking into an example that LVRBs are allocated to UE2, data are transmitted to a single UE via LVRBs spaced apart from each other on a frequency domain. Hence, effect of distributed allocation is consequently implemented to obtain frequency diversity gain.

FIG. 2A and FIG. 2B are diagrams of a structure for transmitting downlink signals by distributed allocation.

Unlike FIG. 1, if RB for distributed allocation is named DVRB (distributed virtual RB), the DVRB, as shown in FIG. 2A or FIG. 2B, can be constructed with subcarriers separated from each other on a frequency domain or a time-frequency domain. In this case, referring to FIG. 2A and FIG. 2B, even if data amounting to a single RB or a small count of RBs are transmitted to a single UE, it is transmitted by being distributed across a wide band through discontinuous subcarriers using DVRBs. Hence, distributed allocation can be implemented.

DISCLOSURE OF THE INVENTION

Technical Problem

Although the schemes for data packet transmission in downlink signal transmission, as mentioned in the foregoing description, clearly include the localized allocation, the distributed allocation, and the combination thereof, a scheme for transmitting the aforesaid downlink control signal together with the downlink data packet by localized allocation and/or distributed allocation has not been clearly specified or proposed. Hence, the demand for discussing a method of transmitting a control signal containing scheduling information for downlink data transmission in downlink control signals, a control signal containing scheduling information for uplink data transmission, and the like efficiently by considering their characteristics has risen.

Technical Solution

Accordingly, the present invention is directed to a structure of a downlink control signal and a method of transmitting the same that substantially obviate one or more of the problems due to limitations and disadvantages of the related art.

An object of the present invention is to provide a structure of a downlink control signal and a method of transmitting the same, by which localized allocation and distributed allocation are efficiently used in transmitting a downlink control signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting a downlink control signal, which includes scheduling information on uplink data transmission and which is transmitted by a base station, according to the present invention includes the steps of multiplexing the downlink control signal in a manner of if there exists downlink data transmission to a prescribed UE, applying localized allocation to a transmission of the downlink control signal including the scheduling information on the uplink data transmission of the UE and applying distributed allocation to another transmission of the downlink control signal and transmitting the multiplexed downlink control signal.

Preferably, the downlink control signal is multiplexed and transmitted in a manner of using the distributed allocation for at least one OFDM symbol from an available first OFDM symbol and using the localized allocation for other OFDM symbols following the at least one OFDM symbol.

More preferably, the downlink control signal allocated by the distributed allocation is allocated in a manner of being distributed by a group unit of a predetermined number of consecutive subcarriers decided suitable for a size of a resource block (RB) used for the uplink data transmission or an integral multiple of the size.

Preferably, the downlink control signal transmitted using the localized allocation is carried by a partial area of a resource block carrying downlink data to the UE.

More preferably, a count of the at least one OFDM symbol used for the distributed allocation and a count of the OFDM symbols used for the localized allocation are delivered to entire UEs within a cell on a downlink common channel.

More preferably, if the downlink control signal transmitted by the distributed allocation includes the scheduling information on the downlink data transmission to the prescribed UE, the downlink control signal includes an indicator indicating whether the scheduling information on the uplink data transmission for the UE is carried within a resource area carrying downlink data to the UE.

Preferably, the scheduling information on the uplink data transmission included in the downlink control signal indicates a group of resource blocks used for the scheduled uplink data transmission.

Preferably, a subcarrier failing to carry the downlink control signal among subcarriers within the at least one OFDM symbol set to enable the downlink control signal transmission carries downlink data.

More preferably, the base station broadcasts a size of time-frequency resource for carrying the downlink control signal for the at least one OFDM symbol set to enable the downlink control signal transmission.

Moreover, the base station and entire UEs within a cell serviced by the base station know transmission pattern information on the downlink control signal previously decided according to a size of the time-frequency resource carrying the downlink control signal.

In this case, the previously decided transmission pattern of the downlink control signal according to the size of the time-frequency resource carrying the downlink control signal is used for the downlink control signal transmission in order of symbols from the first available OFDM symbol.

More preferably, the base station broadcasts a size of the time-frequency resource carrying the downlink control signal for the at least one OFDM symbol set to enable the downlink control signal transmission and a size of the time-frequency resource not used for both of the downlink control signal transmission and the downlink data transmission.

More preferably, the base station broadcasts a size of the time-frequency resource carrying the downlink data for the at least one OFDM symbol set to enable the downlink control signal transmission.

Preferably, a count of uplink data packets transmittable within a transmit time interval (TTI) and a count of downlink data packets transmittable within the TTI are set smaller than a maximum count of the uplink data packets transmittable within the TTI and a maximum count of the downlink data packets transmittable within the TTI, respectively.

Preferably, a count of scheduling informations on the uplink data transmission transmittable within a transmit time interval (TTI), a count of scheduling informations on the downlink data transmission, and a total count resulting from adding the former counts together are set smaller than a maximum count of transmittable scheduling informations with the TTI.

Preferably, information indicating which one of the distributed allocation and the localized allocation is used by each UE to receive the downlink control signal is previously decided for a time longer than a TTI and wherein the base station notifies the information per the UE to the corresponding UE via RRC signaling in advance.

Preferably, the corresponding UE searches a prescribed resource area having a downlink radio channel quality reported as good via downlink radio channel quality information reported to the base station by the corresponding UE for the downlink control signal transmitted by the localized allocation.

Preferably, the base station notifies information on a resource area carrying the downlink control signal using the localized allocation to entire UEs within a cell in a bitmap format.

Preferably, a transmission format of the downlink control signal is designated in advance to each UE for a time longer than 1 TTI and the base station notifies the downlink control signal transmission format to the each UE via RRC signaling in advance.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, a downlink control signal transmitting method according to one embodiment of the present invention considers advantages and disadvantages of localized and distributed allocations, thereby enabling both transmission efficiency of the localized allocation and diversity gain of the distributed allocation to be obtained.

Secondly, in a downlink control signal transmitting structure transmitted by localized allocation and distributed allocation, a transmission signal by general distributed resource allocation is provided to a front end of a single TTI (transmit time interval) and a transmission signal by localized allocation is provided to a rear end of the corresponding TTI. Hence, the present invention can elastically cope with a size of a control signal.

Thirdly, an indicator for control information included localized allocation or the like is included in a portion by distributed resource allocation, whereby reception efficiency can be raised.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Figure 1:
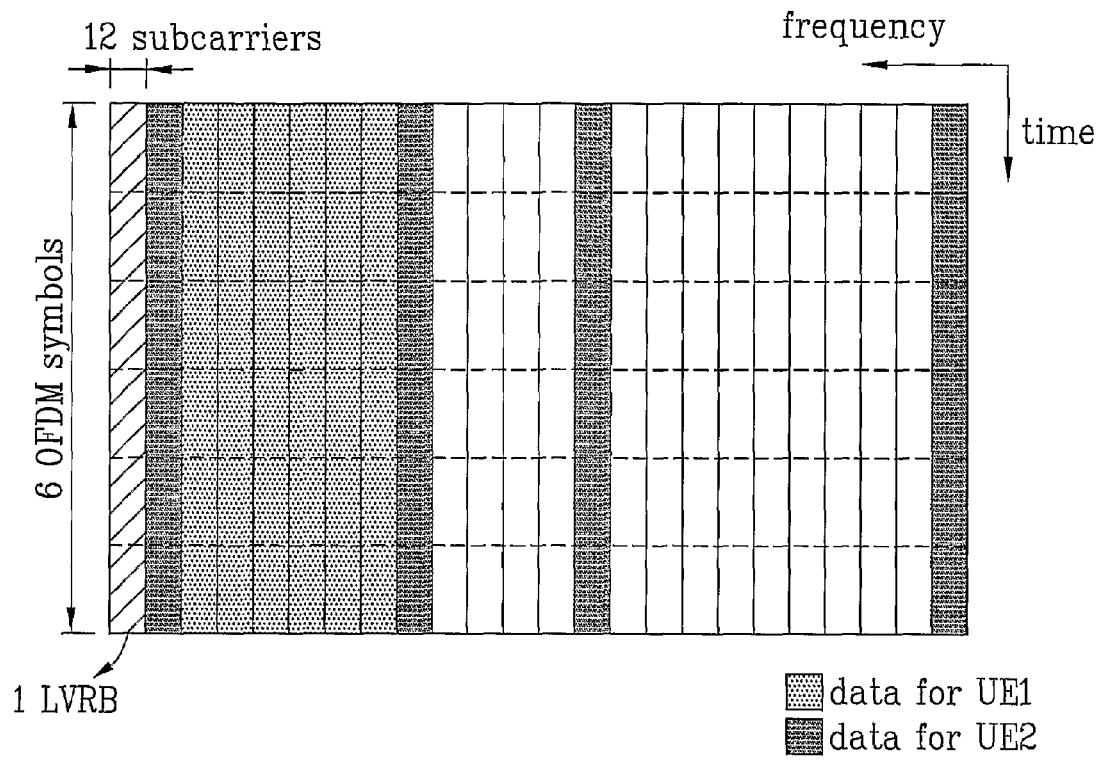
FIG. 1 is a diagram of a structure for transmitting a downlink signal by localized allocation.
Figure 2A:
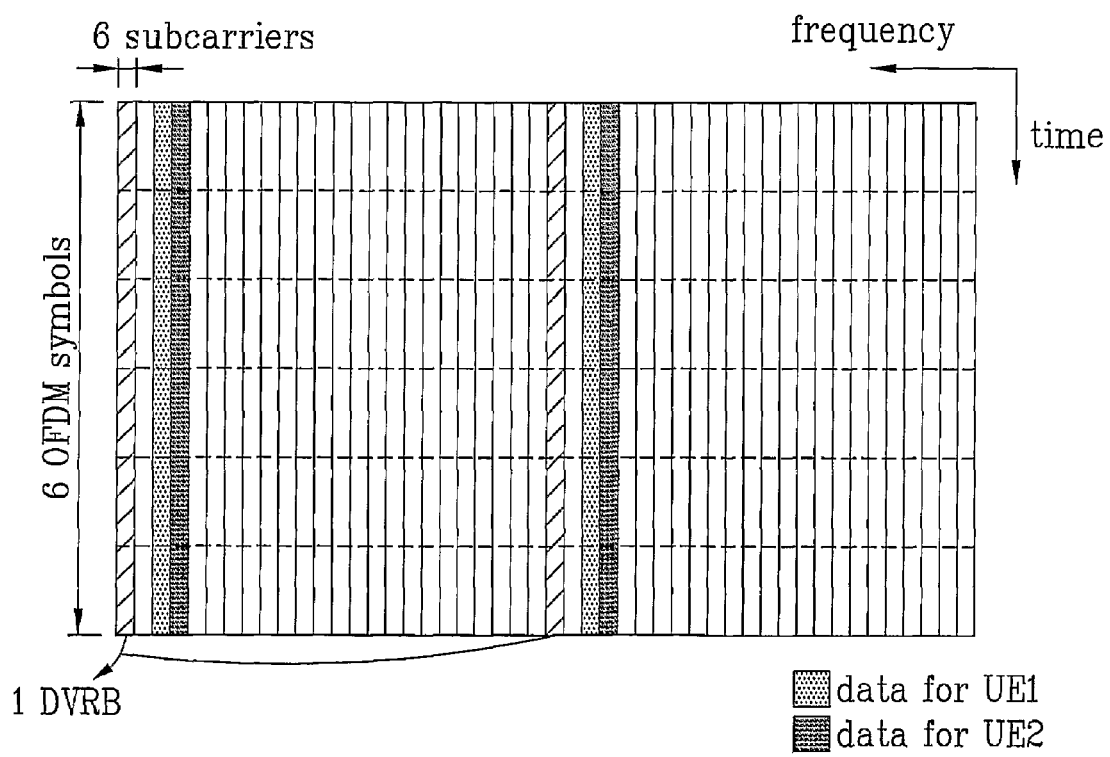
FIG. 2A and FIG. 2B are diagrams of a structure for transmitting downlink signals by distributed allocation.
Figure 2B:
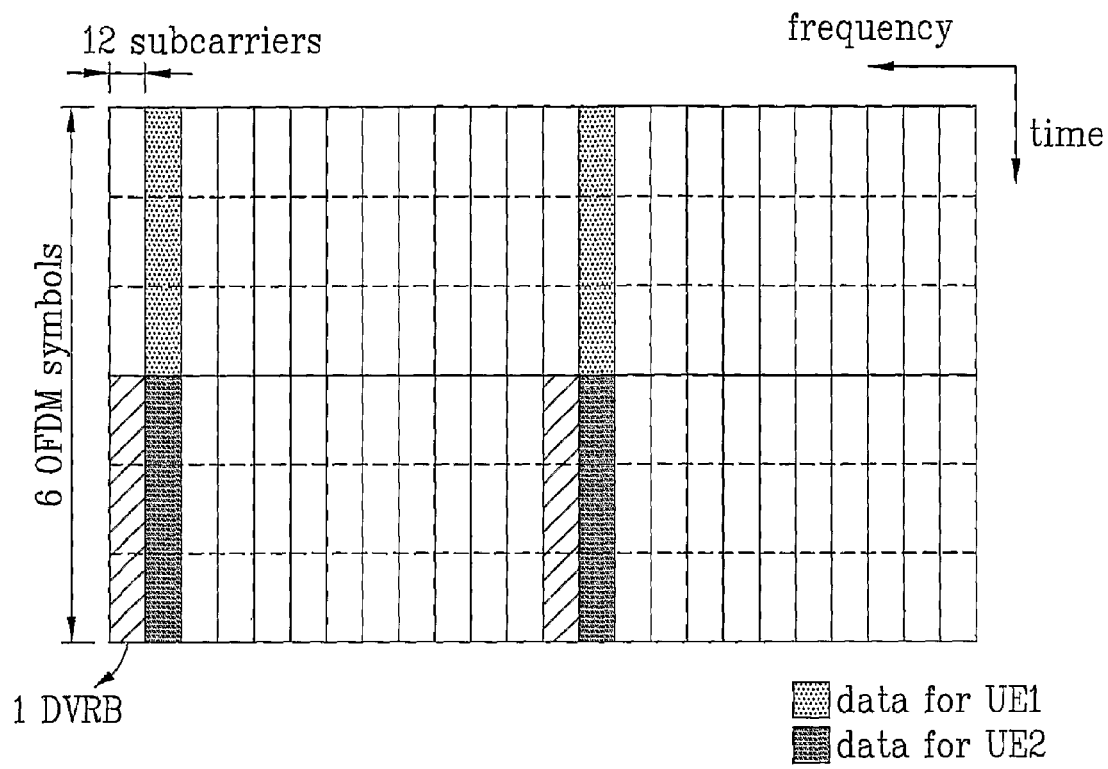

Reference will now be made in detail to the preferred embodiments of the present invention, examples of which are illustrated in the accompanying drawings. In the following description, a scheduling signal is mainly used as a downlink control signal. Yet, it is apparent that the present invention is applicable to other downlink control signals as well.

In the following description, details are included to help complete understanding of the present invention. Yet, it is apparent to those skilled in the art that the present invention can be implemented without those details. For clarity of the concept of the present invention, the well-known structures and devices are omitted or illustrated as block diagrams for core functions of the respective structures and devices. Wherever possible, the same reference numbers will be used throughout the drawings to refer to the same or like parts.

A method of multiplexing a downlink control signal using both localized allocation and distributed allocation properly according to tone embodiment of the present invention is explained as follows.

First of all, in collusion with the aforesaid downlink data packet transmission, a downlink scheduling signal, which is a control signal that carries scheduling information on downlink data, can be transmitted by localized allocation or distributed allocation.

For instance, in transmitting a data packet to a prescribed UE, if a downlink data packet is transmitted by localized allocation on a specific frequency band that is decided as having good downlink radio channel characteristics for the corresponding UE, it is able to raise scheduling signal receiving performance in a manner that a scheduling signal for the downlink data packet transmission is transmitted within the same band (i.e., portion of the band on which the downlink data packet is transmitted).

On the contrary, like the case that data packet is transmitted by distributed allocation to a UE, of which downlink radio channel characteristics are difficult to be estimated or which has difficulty in being reflected on downlink data packet transmission, a scheduling signal is transmitted in a manner of being distributed on a wide band. Hence, frequency diversity gain on scheduling signal reception can be obtained. Besides, it may be necessary to transmit a scheduling signal corresponding to the above downlink data packet transmission by distributed allocation in correspondence to an operational demand made by another system regardless of a transmission method of downlink data packet.

Yet, distributed allocation is generally suitable for transmitting a downlink scheduling signal containing scheduling information on uplink data transmission. If downlink data packet transmission to a prescribed UE is rare and if uplink data packet transmission is frequently made by the UE, a base station may have difficulty in estimating downlink radio channel characteristics of the UE. In case that a base station transmits a downlink data packet to a prescribed UE by localized allocation at a timing point that the prescribed UE should transmit an uplink data packet, the base station is able to know downlink radio channel characteristics of the UE. In this case, it is advantageous in obtaining higher transmission efficiency that a downlink scheduling signal for uplink data of the UE is transmitted within a frequency band for carrying the downlink data packet.

By taking the above-explained advantages and disadvantages into consideration, according to one embodiment of the present invention, in transmitting a downlink control signal containing scheduling information on uplink/downlink data packet transmission, both localized allocation and distributed allocation are supported. Yet, if there exists downlink data transmission to a specific UE, the localized allocation is used for downlink control signal transmission including scheduling information on uplink data transmission of the specific UE. Otherwise, a downlink control signal is multiplexed and transmitted by the distributed allocation.

In particular, according to one embodiment of the present invention that considers a downlink control signal transmission structure, if a basic time interval for transmitting a scheduling signal and a data packet in downlink to each UE is defined as TTI (transmit time interval), distributed allocation is used for downlink scheduling signal transmission for at least one or more OFDM symbol intervals ranging from a first OFDM symbol within a TTI or a second OFDM symbol in case of using a first OFDM symbol for another purpose (hereinafter represented as 'from a first available symbol') to a prescribed OFDM symbol. A downlink control signal is then transmitted by localized allocation from an OFDM symbol behind the prescribed OFDM symbol if necessary.

In the above-explained embodiment of the present invention, the distributed allocation is generally used for the downlink control signal transmission and the localized allocation is used for a specific case that there exists downlink data transmission to a corresponding UE. As mentioned in the foregoing description, it is able to multiplex a downlink control signal more flexibly with a downlink control signal transmission structure by OFDM symbol unit. Moreover, a presence or non-presence of a control signal multiplexed by the localized allocation or the like can be represented using an indicator, which is provided to a front portion within a TTI, of a control signal multiplexed by the distributed allocation. Hence, a size of a control signal multiplexed by distributed resource allocation can be reduced.

Figure 3A:
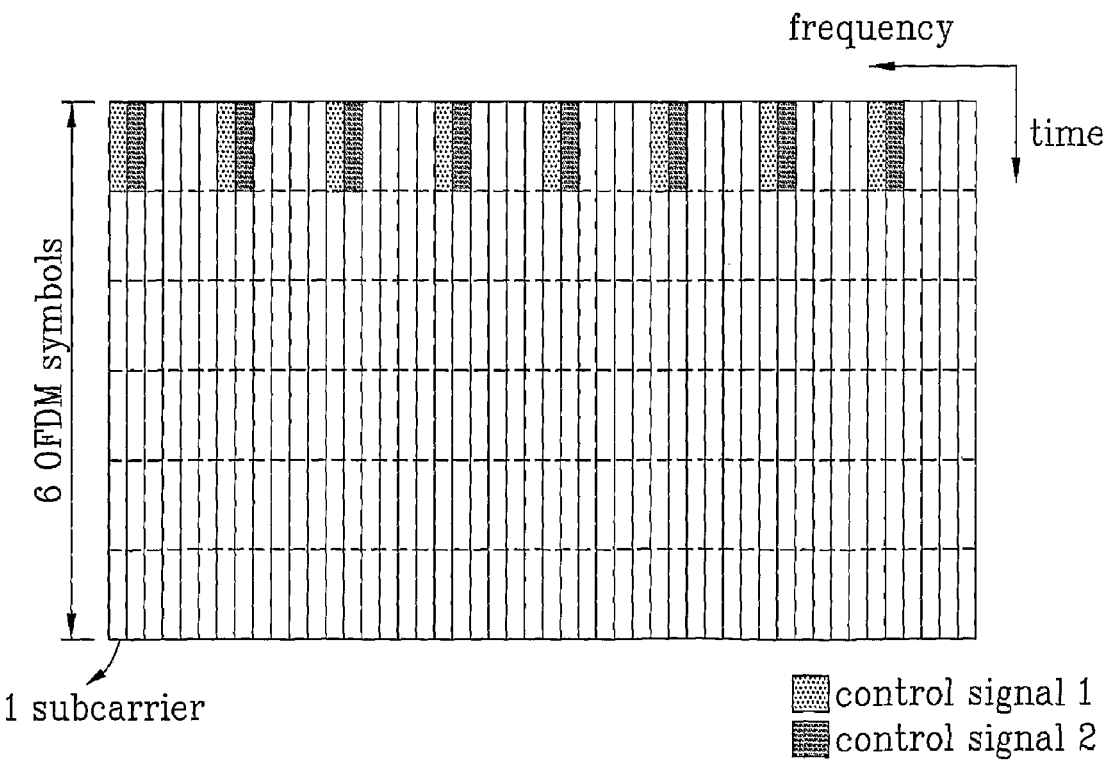
FIG. 3A and FIG. 3B are diagrams of a structure for transmitting a downlink control signal for a first available OFDM symbol by distributed allocation according to one embodiment of the present invention.
Figure 3B:
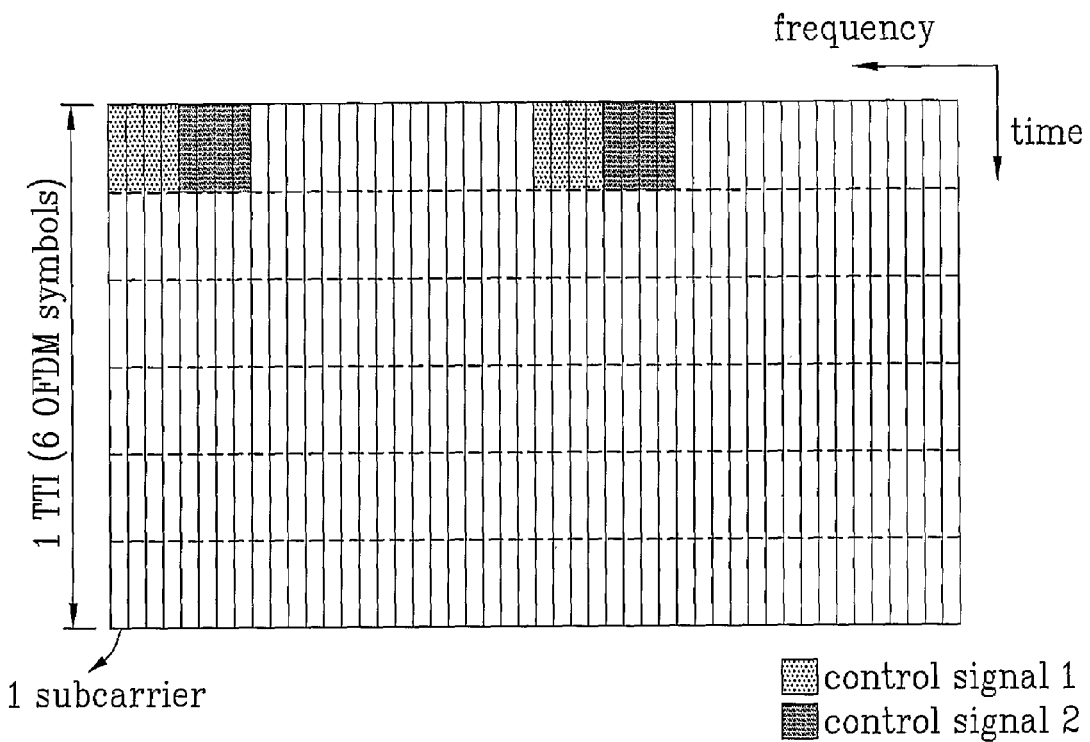

FIG. 3A and FIG. 3B are diagrams of a structure for transmitting a downlink control signal for a first available OFDM symbol by distributed allocation according to one embodiment of the present invention.

As mentioned in the foregoing description, when a downlink control signal is transmitted by distributed allocation for an interval ranging from a first available OFDM symbol to a prescribed symbol, a plurality of scheduling signals can be multiplexed by being distributed and allocated to at least one or more OFDM symbols within a single TTI to transmit scheduling information on a plurality of data packets transmitted in uplink or downlink for the corresponding TTI.

In particular, scheduling signals including a control signal-1 and a control signal-2, as shown in FIG. 3A, can be respectively distributed by a subcarrier unit. Alternatively, scheduling signals including a control signal-1 and a control signal-2, as shown in FIG. 3B, can be respectively distributed by a group unit including a plurality of subcarriers consecutive on a frequency domain. FIG. 3B shows that four subcarriers consecutive on a frequency domain construct one group.

In case that a downlink control signal, as shown in FIG. 3B, is distributed on a frequency domain by a subcarrier group unit, if a count of subcarriers within a group is equally set to a count of subcarriers allocated to a single RB for carrying data packet (e.g., 12 subcarriers in case of the LVRB shown in FIG. 1) or set to an integral multiple, when a scheduling signal occupies a partial area of an RB used for data packet transmission according to one preferred embodiment of the present invention, it is advantageous in that a reduced amount of a substantial RB size can be evenly fitted.

Figure 4:
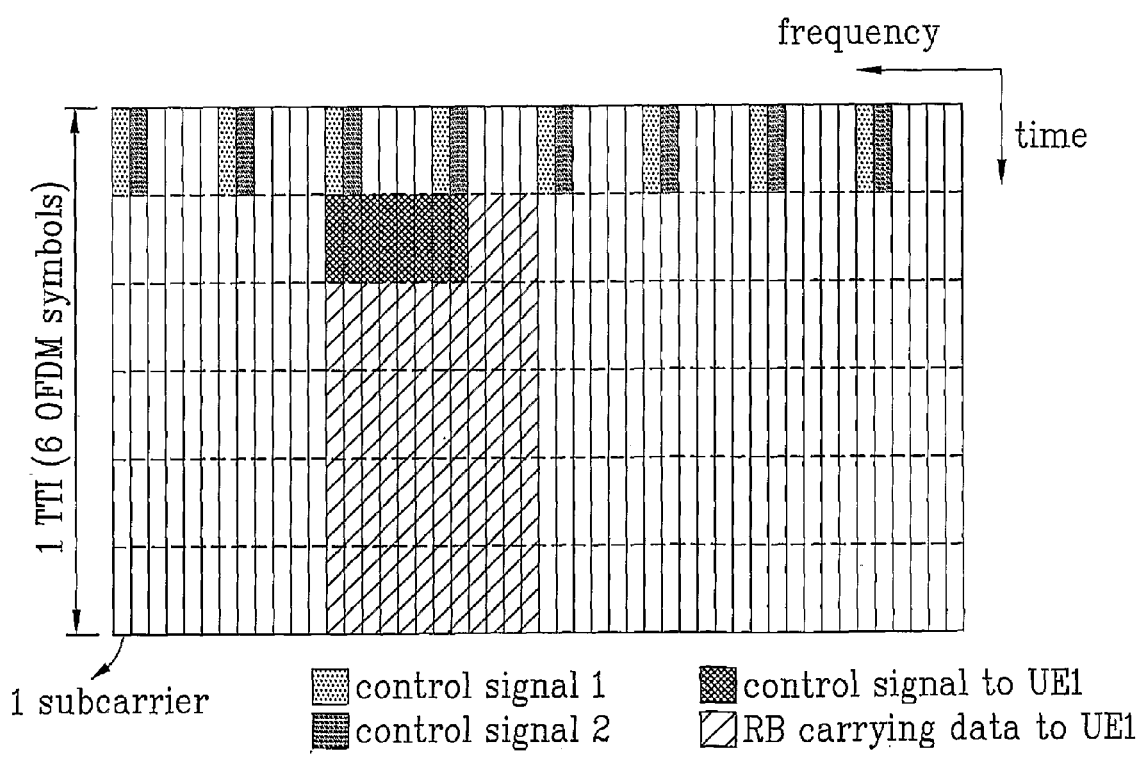
FIG. 4 is a diagram of a structure for transmitting a downlink control signal by localized allocation after OFDM symbol by distributed allocation according to one embodiment of the present invention.

FIG. 4 is a diagram of a structure for transmitting a downlink control signal by localized allocation after OFDM symbol by distributed allocation according to one embodiment of the present invention.

According to the aforesaid one embodiment of the present invention, OFDM symbols, which are transmitted behind another OFDM symbol(s) used for distributed allocation transmission of a scheduling signal among OFDM symbols within a TTI, are transmitted by localized allocation of a scheduling signal. Downlink control signal transmission to a specific UE (e.g., UE1 in FIG. 4) by localized allocation for such a random TTI is applicable only if there exists downlink data packet transmission to the corresponding UE within the TTI via LVRB. In this case, a scheduling signal, as shown in FIG. 4, can be transmitted using partial areas of LVRBs carrying downlink data packets to the corresponding UE.

Meanwhile, scheduling signal transmission by distributed allocation is commonly usable for scheduling information transmission for downlink data packet transmission using LVRB or DVRB. Yet, scheduling signal transmission by localized allocation is usable for scheduling information transmission for downlink data packet transmission using LVRB only.

Besides, in the embodiment of the present invention shown in FIG. 4, how many OFDM symbols are used for distributed allocation scheduling signal transmission or how many OFDM symbols are used for localized allocation scheduling signal transmission can be informed via a downlink common channel each TTI, periodically, or if necessary.

According to the aforesaid embodiment of the present invention, scheduling information on uplink data packet transmission is basically carried by a distributed allocation transmission control signal. Yet, in case of attempting to transmit scheduling information on uplink data packet transmission to a random UE while transmitting downlink data packet to the same UE within a random TTI, scheduling information on uplink data packet can be carried by an RB area for carrying data packet to the UE while scheduling information on the downlink data packet transmitted to the UE is transmitted via a localized allocation transmission control signal.

In the above-explained scheduling signal transmitting schemes, information carried by a scheduling signal transmitted by distributed allocation includes the aforesaid category-A scheduling information for downlink data packet transmission at least in association with the related art. And, the information can include the category-B scheduling information partially or entirely added to the category-A information for uplink data packet transmission.

Moreover, a scheduling signal transmitted by localized allocation can include the category-B scheduling information entirely or partially added to the category-A information.

According to one preferred embodiment of the present invention, scheduling information on a control signal transmitted by distributed allocation can include an indicator indicating whether the scheduling information is scheduling information on downlink data packet transmission or scheduling information on uplink data packet transmission.

In case that scheduling information on a scheduling signal transmitted by distributed allocation is scheduling information on downlink data packet transmission, it can include an indicator indicating whether scheduling information on uplink data transmission to a corresponding UE is carried within an RB area for carrying downlink data packet to the corresponding UE.

In this case, as can be seen from the downlink control signal structure according to one embodiment of the present invention shown in FIG. 4, by enabling a preceding OFDM symbol according to distributed allocation to inform a presence or non-presence of scheduling information on uplink data packet transmission to a corresponding UE for a subsequent OFDM symbol interval according to localized allocation, it is advantageous that the corresponding UE is facilitated to search the scheduling information. And, it is also advantageous that a size of a control signal transmitted by distributed resource allocation can be reduced.

Meanwhile, category-A scheduling information transmitted to a random UE can include bitmap information for indicating RBs used in transmitting downlink data packet to the corresponding UE or RBs used in enabling the UE to transmit uplink data packet. Namely, when N RBs exist within a single TTI, each bit within N-bit bitmap information is mapped by a preset rule with a corresponding RB existing within the TTI. And, the bit can represent information about whether a corresponding RB is allocated to data.

In this case, when numerous RBs exist within a single TTI, too many bits may be needed to indicate whether the respective RBs are used via bitmap information. So, overhead of scheduling information may be excessively large.

For this case, according to one embodiment of the present invention, RBs within a single TTI are grouped by a predetermined count, e.g., by M, in correspondence to a preset rule and a scheduled RB group is then informed of as bitmap information instead of scheduled RB. Hence, overhead of scheduling information can be reduced. In this case, 'M' is an integer equal to or greater than 2 and a single RB group can include different RBs on a frequency or time domain.

In the above-explained scheme, a UE basically attempts or tries decoding of scheduling information for all possible downlink control signal positions transmittable by localized allocation or distributed allocation to read the scheduling information transmitted to itself. If there exists scheduling information that contains ID of the corresponding UE, the corresponding UE recognizes that the scheduling information is transmitted to itself and then receives downlink data packet or transmits uplink data packet in correspondence to the information.

If so, there may exist a various number of frequency-time resource sizes that the UE should attempt to read. This may impose a burden on the UE. So, it is preferable that a downlink control signal the corresponding UE attempt to read is limited, which will be explained later.

Meanwhile, according to one embodiment of the present invention, in case that a downlink control signal is not actually carried for OFDM symbol(s) set to enable downlink control signal transmission, it is proposed that downlink data should be carried for the corresponding symbol(s). This is described as follows.

Figure 5:
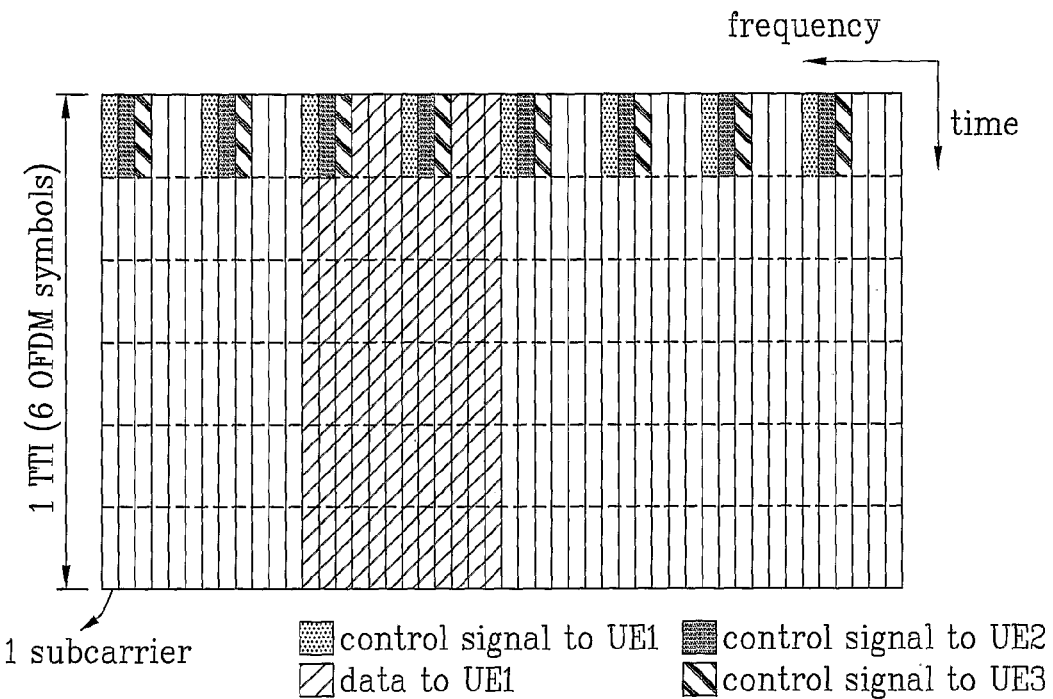
FIG. 5 is a diagram of a structure for transmitting downlink data to a resource block to which a control signal is not transmitted within OFDM symbol for downlink control signal transmission according to one embodiment of the present invention.

FIG. 5 is a diagram of a structure for transmitting downlink data to a resource block to which a control signal is not transmitted within OFDM symbol for downlink control signal transmission according to one embodiment of the present invention.

First of all, a count of uplink and downlink data packets schedulable within a single TTI may differ for each TTI. So, a unit of scheduling signals transmitted in downlink for each TTI may vary. Yet, if a specific count of downlink OFDM symbols are always reserved for scheduling signal transmission and then exclusively used, time-frequency resource except a frequency domain actually carrying a scheduling signal within the reserved OFDM is wasted in the TTI for transmitting a small count of scheduling signals for example.

Hence, in the aforesaid one embodiment of the present invention, a method of transmitting downlink packet data on a time-frequency domain failing to carry a scheduling signal actually within at least one or more OFDM symbols set to enable scheduling signal transmission is proposed. And, a corresponding downlink transmission signal structure is shown in FIG. 5.

Referring to FIG. 5, a single TTI is constructed with 6 OFDM symbols. And, a first OFDM symbol among the 6 OFDM symbols is set to be used for downlink control signal transmission of UE1 to UE3 by distributed allocation. Yet, FIG. 5 shows that the rest of areas except an area for actually carrying a distributed allocation scheduling signal within the OFDM symbol are allocated to downlink data packet transmission to the UE1.

In this case, a size of frequency-time resource that can be allocated to data transmission via a single downlink RB may vary each TTI according to whether a portion of the RB is used for distributed allocation scheduling signal transmission. Namely, as can be seen from the example shown in FIG. 5, the UE1 is unable to correctly know what kind of area within a scheduled RB is used to carry the data transmitted to the UE1 unless knowing that partial areas of downlink RBs allocated for the data packet transmitted to the UE1 are used for a scheduling signal transmitted to another UE (UE2 or UE3). So, the UE1 is unable to receive the data packet correctly.

According to one embodiment of the present invention, in order for UEs within a cell to know which areas within OFDM symbols set to be used for scheduling signal transmission within a random TTI are actually used for scheduling signal transmission, a base station notifies a count of scheduling signals transmitted within the TTI to the UEs within the cell each TTI.

In this case, it is able to previously decide a rule for deciding an area for transmitting a scheduling signal according to a count of scheduling signals actually transmitted for each TTI. So, the entire UEs within the cell are able to know which areas of downlink time-frequency resources are used by scheduling signals transmitted to other UEs as well as scheduling signals transmitted to themselves and what kind of time-frequency domain is actually used for data transmission in each downlink RB, through the count of the scheduling signals notified by the base station.

Figure 6:
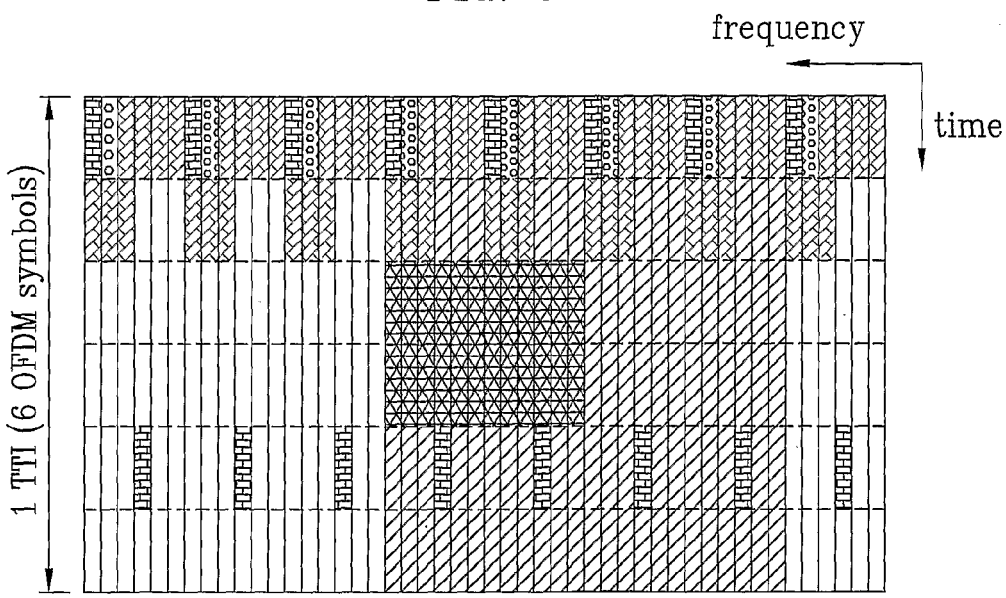
FIG. 6 is a diagram of an overall structure for transmitting a downlink control signal in association with FIG. 4 and FIG. 5 according to one embodiment of the present invention.

In particular, according to one embodiment of the present invention, as a count of transmitted scheduling signals increases, OFDM symbols set to be used for scheduling signal transmission are sequentially used. For instance, assuming that OFDM symbols are set to be used for scheduling signal transmission in a manner of using a first OFDM symbol within a TTI, after time-frequency resources available for scheduling signal transmission in the first OFDM symbol have been completely used, a next OFDM symbol is used according to a preset rule in correspondence to the increasing scheduling signal count. Thus, an example of performing OFDM symbol allocation for control signal transmission sequentially is shown in FIG. 6. And, a detailed structure will be explained later.

Meanwhile, since a count of actually transmitted scheduling signals may vary for each TTI, it is preferable that a count of scheduling signals transmitted for each TTI should be broadcasted via a physical channel separate from that of the scheduling signals to enable entire UEs within a cell to receive the count of the transmitted scheduling signals.

Besides, a scheduling signal needs to be transmitted with a large power to secure reception performance in a UE far away from a base station. In this case, even if a subcarrier fails to carry a scheduling signal within OFDM symbols carrying the scheduling signal, most of the maximum transmission power of the base station is consumed by scheduling signals. So, there can exist subcarriers capable of transmitting nothing.

For this, according to one embodiment of the present invention, the base station broadcasts information, which includes the aforesaid area (or count of scheduling signals) used for the scheduling signal transmission and subcarrier area (or scheduling signal count corresponding to the area) capable of transmitting nothing within the OFDM symbols capable of carrying downlink control signal. If so, the UEs are able to know a portion used for data transmission within OFDM symbol carrying scheduling signal.

To achieve the same effects as the above embodiment, in another method according to one embodiment of the present invention, information on an area actually used for data transmission for TTI within OFDM symbols capable of carrying scheduling signal can be directly broadcasted instead of enabling the aforesaid base station to transmit information on the area for carrying scheduling signal or broadcast information on an area carrying scheduling signal and information on an area carrying nothing.

So, in the following description, scheduling signal area (count) information means information on an area carrying scheduling signal and information on an area carrying nothing or information on an area used for data transmission.

Meanwhile, instead of enabling the base station to broadcast the scheduling signal area information to UEs within a cell, it is possible to transmit the scheduling signal area information carried within downlink data packet scheduling signal carrying data in downlink to each UE as well.

Namely, UEs receiving data in downlink need to know how many time-frequency domains are actually used for transmission by a scheduling signal for a prescribed TTI and how many time-frequency domains are actually used for transmission by data. So, a same object can be achieved in a manner that the scheduling signal area information is included in the information carried by downlink scheduling signal to each of the UEs. In doing so, the scheduling signal area information is channel-coded together with other scheduling information. So, it is advantageous that more coding gain can be obtained. Yet, since the same information is transmitted to each of a plurality of UEs for a single TTI, a consequent performance gain varies according to a count of scheduling signals transmitted for a single TTI and channel coding scheme of scheduling signal. In transmitting the scheduling signal area information together with scheduling information, it is preferable that the scheduling signal area information is included in the aforesaid category-A information.

According to one embodiment of the present invention, in order to reduce a scheduling signal receiving burden imposed on UE and use downlink time-frequency resource efficiently, a maximum count of downlink data packets schedulable within a TTI or a maximum count of uplink data packets can be limited to be smaller than an actually transmittable maximum count.

To achieve the same effects as the above embodiment, in another method according to one embodiment of the present invention, it is able to put limitation on a count of scheduling information on downlink data packets transmittable within a TTI or a count of scheduling information on uplink data packets transmittable within a TTI.

Besides, it is able to put limitation on a total count resulting from adding a count of scheduling information on uplink data packets transmittable within a TTI and a count of scheduling information on downlink data packets transmittable within a TTI together. The above maximum value(s) can be forwarded to UE from a base station via RRC signaling of upper layers.

In a method of using both a distributed allocation scheduling signal and a localized allocation scheduling signal according to one embodiment of the present invention, the scheme of notifying the count of the scheduling signals to the UEs and the scheme of limiting the count of the scheduling signals can be applied to the distributed allocation scheduling signal only.

In this method, if a base station broadcasts a count of distributed allocation scheduling signals for each TTI, each UE tries reception for time-frequency domains preset to transmit the distributed allocation scheduling signals according to the count only. If there exists scheduling information containing ID of the corresponding UE, the UE follows the scheduling information.

Yet, since the localized allocation scheduling signals are transmitted on time-frequency domains within RBs carrying downlink data packets, a UE should basically try reception on localized allocation scheduling signal transmitting areas available within the entire RBs. Moreover, if the UE needs to try receptions on both of the localized and distributed allocation scheduling signals, a burden imposed on the corresponding UE is raised. To reduce the burden imposed on the UE for scheduling signal reception, one embodiment of the present invention proposes the following schemes.

In a first scheme, whether to receive a distributed allocation scheduling signal or a localized allocation scheduling signal is decided for each UE. The corresponding information is then notified to each UE by a base station.

The advantage in transmitting a scheduling signal to a prescribed UE by distributed allocation or localized allocation depends on such a factor not frequently changing as a moving speed of the UE, a service characteristic of the UE, and the like. So, this information needs not to be transmitted frequently. And, the information can be transmitted to each UE from a base station by upper layer signaling without using a separate physical layer signal. In doing so, a random UE tries reception on a scheduling signal transmitted to itself by either the distributed allocation or the localized allocation designated to the corresponding UE only.

In a second scheme, for scheduling signals transmitted by localized allocation, a UE tries reception of a localized allocation scheduling signal on a single RB (or RB group) reported as having a best channel quality or a specific number of RB (or RB group) areas in order reported as having a better channel quality with reference to downlink radio channel quality information reported to a base station by the corresponding UE only.

Generally, each UE within a cell reports downlink radio channel quality information to a base station, periodically or if necessary, to help downlink data packet scheduling of the base station. So, in transmitting downlink data packets to a prescribed UE within a cell, a base station operates in a manner of necessarily using an RB (or RB group) having a best channel quality or one of a specific number of RBs (or RB groups) selected with reference to downlink radio channel qualities reported by the corresponding UE. If the base station transmits a localized allocation scheduling signal into the corresponding RB (or RB group) area, the corresponding UE is able to receive the localized allocation scheduling signal transmitted to itself by the above-explained scheme.

In this case, the downlink radio channel quality report information, which should be referred to by each UE, can be limited to lately reported information or decided as a specific number of lately reported informations or information reported within a specific time from a current time. For each of the cases, the base station should properly determine RB (or RB group) to be used for downlink radio data packet transmission. And, the base station can transmit to each UE via upper layer signaling how many RBs or RB groups should be considered for localized allocation scheduling signal reception in a range of radio channel quality informations or a single radio channel quality information which the corresponding UE has to refer to.

In a third scheme, a base station notifies RB or RB group carrying a localized allocation scheduling signal to entire UEs within a cell for each TTI by bitmap.

Namely, if a number N of RBs (or RB groups) exist within a single TTI in downlink, each bit of N-bit bitmap information is mapped to each of the RBs (or RB groups). And, each bit is able to represent information indicating whether a localized allocation scheduling signal is carried by the corresponding RB (or RB group). So, a UE reads the bitmap information for each TTI and is then able to try caption of the localized allocation scheduling signal on the RBs (or RB groups) that actually carry the localized allocation scheduling signal without trying reception of the localized allocation scheduling signal on the entire RBs (or RB groups).

In particular, according to one embodiment of the present invention, the bitmap information can be broadcasted for each TTI by being coded together with the count information of the distributed allocation scheduling signals.

In a fourth scheme, a downlink scheduling signal for data transmitted in downlink is transmitted by distributed allocation only. A downlink scheduling signal for data transmitted in uplink is transmitted by distributed allocation if there is no data to be transmitted in downlink. And, a downlink scheduling signal for data transmitted in uplink is transmitted by localized allocation within RBs (or RB groups) if there is data to be transmitted in downlink.

At least one of the above four schemes is simultaneously applied to a system to reduce a burden imposed on UE in scheduling signal reception.

FIG. 6 is a diagram of an overall structure for transmitting a downlink control signal in association with FIG. 4 and FIG. 5 according to one embodiment of the present invention.

Referring to FIG. 6, a single TTI includes six OFDM symbols. Partial subcarriers of first and fifth OFDM symbols carry downlink pilot signals. In the first OFDM symbol, a count of localized allocation scheduling signals transmitted for the TTI can be broadcasted by being distributed by a subcarrier unit. And, bitmap information on localized allocation scheduling signals can be also broadcasted by being distributed by a subcarrier unit in addition to the count of the localized allocation scheduling signals.

The distributed allocation scheduling signals can be transmitted by being distributed at a subcarrier level from the first OFDM symbol. In an example shown in FIG. 6, the first OFDM symbol and a portion of a second OFDM symbol are used for distributed allocation scheduling signal transmission. And, FIG. 6 shows an example that downlink data packet scheduling signals for UE1 are transmitted by localized allocation via a partial area of RB carrying downlink data packets to the UE1.

Meanwhile, one embodiment of the present invention proposes a scheme for supporting changeability of a scheduling information transmitting format, which is explained in the following description.

Figure 7:
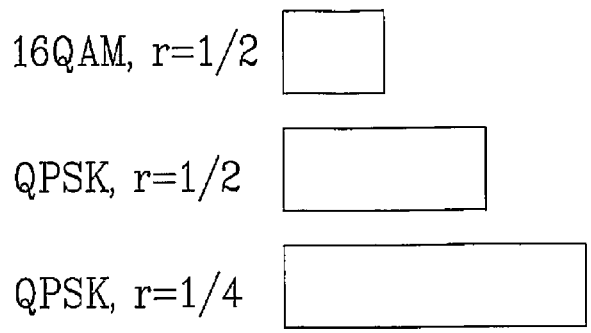
FIG. 7 is a diagram of a size variation of time-frequency resource required for scheduling signal transmission in different scheduling information transmission formats.

FIG. 7 is a diagram of a size variation of time-frequency resource required for scheduling signal transmission in different scheduling information transmission formats.

Referring to FIG. 7, uplink/downlink scheduling information transmitted in downlink for each TTI for each UE is transmitted in a format of a scheduling signal through proper coding and modulation. For clarity and convenience, a coding rate (r), a modulation scheme and the like applied to scheduling information are named 'transmission format of scheduling information' or 'transmission format of scheduling signal'.

In this case, radio channel statuses of respective UEs within a cell may differ from each other. In particular, the radio channel statuses can vary considerably according to a distance from a base station of the UEs or a presence or non-presence of an obstacle. So, it is inefficient to apply the same transmission format to scheduling information transmission for the entire UEs within the cell. Preferably, different transmission formats are applied to the UEs according to radio channel statuses, respectively. If the transmission format applied to the scheduling information is changed, a size of time-frequency resource required for transmitting a corresponding scheduling signal actually can be changed. FIG. 7 shows time-frequency resource sizes necessary for different scheduling information transmitting formats, respectively.

Meanwhile, if a base station arbitrarily selects a transmission format applicable to scheduling information transmitted to a prescribed UE for each TTI, the corresponding UE has to try reception of a scheduling signal on all possible transmission formats for each TTI.

Therefore, one embodiment of the present invention proposes a scheme of selecting time frequency resource size for the transmission format applicable to scheduling information transmitted to a specific UE only among one or multiple of minimum time frequency domain unit. The concept of 'minimum time frequency domain unit' is first proposed in the U.S. provisional patent application 60/827,852, the title of which is "A structure of downlink control signal in a multiple-carrier communication system", invented by the inventor of this application, filed by the applicant of this application, and which consists the one basis of the priority claims of this application. This concept of 'minimum time frequency domain unit' is accepted by the 3GPP LTE system as the concept of "control channel element (CCE)". This is explained in detail by taking an example of 3GPP LTE system as follows.

In the 3GPP LTE system, a plurality of control channel elements (CCEs) can be transmitted via first n OFDM symbols of each subframe. In this case, the CCE can be regarded as a unit of control information transmission as proposed by one embodiment of the present invention. CCE can be placed on time-frequency domain consecutively or distributively. Each CCE consists of a specific number of REs (resource elements). And, PDCCH transmitted to a random UE for a random subframe in transmittable by being matched to a single CCE or a plurality of CCEs. In this case, according to how many CCEs are needed to transmit PDCCH, a coding rage for the corresponding PDCCH is determined. For instance, if a coding rate is $3/4$ when PDCCH having a specific information size is transmitted via a single CCE, it can be adjusted in a manner that a coding rate in transmitting PDCCH having the same information size via two CCEs is $3/8$, that a coding rate in transmitting PDCCH having the same information size via four CCEs is $3/16$, or that a coding rate in transmitting PDCCH having the same information size via eight CCEs is $3/32$.

CCEs are allocated to a UE, which should confirm whether there exists PDCCH transmitted to itself, in advance. For instance, assuming that PDCCH carrying prescribed information is transmittable at a coding rate $3/4$, $3/8$, $3/16$, or $3/32$ via a single CCE, two CCEs, four CCEs or eight CCEs, if a prescribed terminal is allocated to confirm first to sixteenth CCEs, the terminal should perform decoding on each CCE in a manner of assuming a case that the PDCCH is transmitted at a coding rate $3/4$, $3/8$, $3/16$ or $3/32$ for the sixteen CCEs for each subframe. Hence, the terminal performs maximum 30 (=16+8+4+2) decodings to check whether there exits PDCCH transmitted to itself. This corresponds to the assumption that mapping of PDCCH to CCE is carried out by a tree structure via a neighbor CCE only. If the PDCCH mapping becomes more free, a count of decodings the UE has to perform may be incremented.

To reduce the reception operation burden imposed on the UE, and more particularly to reduce such a problem as a battery consumption of a UE in a manner of decrementing a decoding count required for PDCCH reception like the 3GPP LTE system, one embodiment of the present invention proposes a scheme for designating a scheduling information transmitting format applicable to scheduling signal transmission of each UE.

In this case, the scheduling information transmission format applied to a scheduling signal transmission for each UE can be specifically designated to a specific format only. Alternatively, a method of designating a range of a coding rate each UE will try a PDCCH reception, a size of a CCE group or the like is usable.

In particular, one embodiment of the present invention proposes a method of specifying a maximum coding rate in a scheduling information transmission format for each UE or specifying a smallest CCE group size.

Thus, in case that a maximum coding rate or a minimum CCE size for each IE is announced for each UE, although allocation is made in a manner that a specific UE checks first to sixteenth CCE in the above-explained example, if it is announced that the maximum coding rate at which the corresponding UE tries a PDCCH reception is $3/8$ or that the minimum CCE group size amounts to two CCEs, the corresponding UE needs not to decode a single CCE (i.e., a case that a coding rate is $3/4$) but just performs maximum 14 (=8+4+2) decodings.

Thus, compared to the method of announcing the minimum coding rate or the maximum group size, the method of specifying the maximum coding rate or the minimum CCE group size per the UE has the following advantages.

For instance, in case of the UE having the maximum coding rate designated to $3/8$ like the above-explained example, as a next channel status is degraded, if scheduling information is transmitted by being coded at a lower coding rate such as $3/16$, it is also able to detect the corresponding scheduling information. Yet, in case of the UE having the minimum coding rate designated to $3/8$, as a next channel status is degraded, if scheduling information is transmitted by being coded a a much lower coding rate such as $3/16$, it gets difficult to detect the corresponding scheduling information. Namely, like the present embodiment, the method of specifying the maximum coding rate or minimum CCE group size applicable to the scheduling information transmission can cope with the low coding rate application due to the future channel degradation more efficiently than the method of specifying the minimum coding rate or maximum CCE group size.

For the same purpose of the above embodiment, another embodiment of the present invention proposes that a base station notifies each UE of a maximum coding rate (or smallest CCE group size) and a minimum coding rate (or largest CCE group size) at which the corresponding UE will try a PDCCH reception.

In particular, as mentioned in the foregoing description of the above example, even if a single UE is assigned to check first to sixteenth CCEs, if it is announced that a maximum coding rate at which the corresponding UE will try a PDCCH reception is $3/8$ (or that a minimum CCE group size amounts to two CCEs) and that a minimum coding rate is $3/16$ (or that a maximum CCE group size amounts to four CCEs), the UE need not perform decoding on the assumption of a single CCE (case of a coding rate $3/4$) and decoding on the assumption of eight CCEs (case of a coding rate $3/32$) but just performs maximum 12 (=8+4) decodings only.

For the same purpose of the above embodiment, a further embodiment of the present invention proposes that a base station notifies each UE of whether the corresponding UE tries a PDCCH reception via a maximum coding rate (or smallest CCE group size) at which the corresponding UE will try the PDCCH reception and via a predetermined number of coding rates below the former coding rate (or a predetermined number of group sizes over a smallest CCE group size).

In particular, as mentioned in the foregoing description of the above example, even if a single UE is assigned to check first to sixteenth CCEs, if 2-step coding rates including a maximum coding rate $3/8$ and a coding rate above $3/8$ at which the corresponding UE will try a PDCCH reception (or 2-step CCE groups) are additionally announced to be checked by the corresponding UE, the UE need not perform decoding on the assumption of a single CCE (case of a coding rate $3/4$) and decoding on the assumption of eight CCEs (case of a coding rate $3/32$) but just performs maximum 12 (=8+4) decodings only.

Using the above-explained methods, the trial decoding count for the PDCCH reception by the UE can be decremented. Hence, it is able to settle such a problem as a battery consumption of UE and the like.

In the above-explained embodiments, the scheduling information transmitting format for each of the UEs needs not to be frequently changed. So, this information can be notified to each UE by the base station via upper layer signaling above a physical layer. And, each of the UEs can try reception of the scheduling signal on the assumption of the transmission format designated to the corresponding UE itself. In doing so, the UE searches a downlink time-frequency area, which carries the scheduling signal, for the scheduling signal by a unit of time-frequency resource size specified to the scheduling information transmitting format designated to itself.

According to a detailed embodiment of the present invention, a scheduling signal receiving operation of a UE can be further simplified in a manner of setting a time-frequency resource size, which is used in transmitting scheduling information in different transmission format, to an integral multiple of a smallest time-frequency resource size used in transmitting scheduling information.

In this case, a size of a smallest time-frequency resource used in transmitting scheduling information can correspond to the above-explained CCE. Namely, the present embodiment proposes to set a time-frequency resource size used in scheduling information differing in a transmission format to a CCE unit. As mentioned in the foregoing description, the CCE can include a consecutive area on time-frequency domain or can have a form distributed on time-frequency domain.

Figure 8A:
FIG. 8A and FIG. 8B are diagrams of examples that UEs having different scheduling information transmission formats designated thereto search for scheduling signals according to one embodiment of the present invention.
Figure 8A:
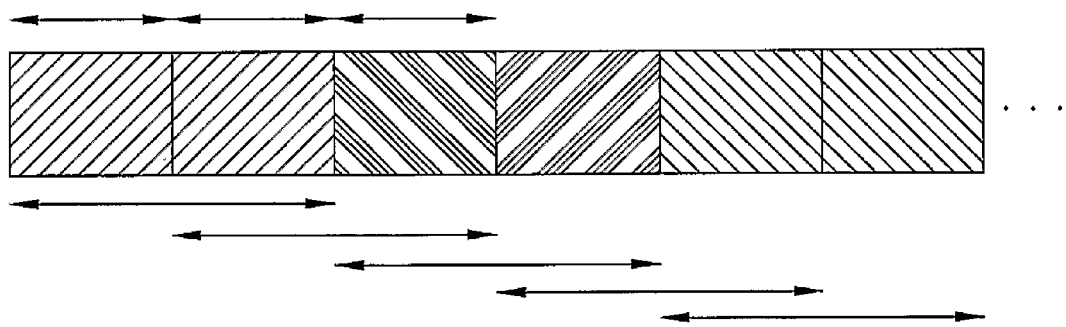
Figure 8A:
Figure 8A:
Figure 8B:
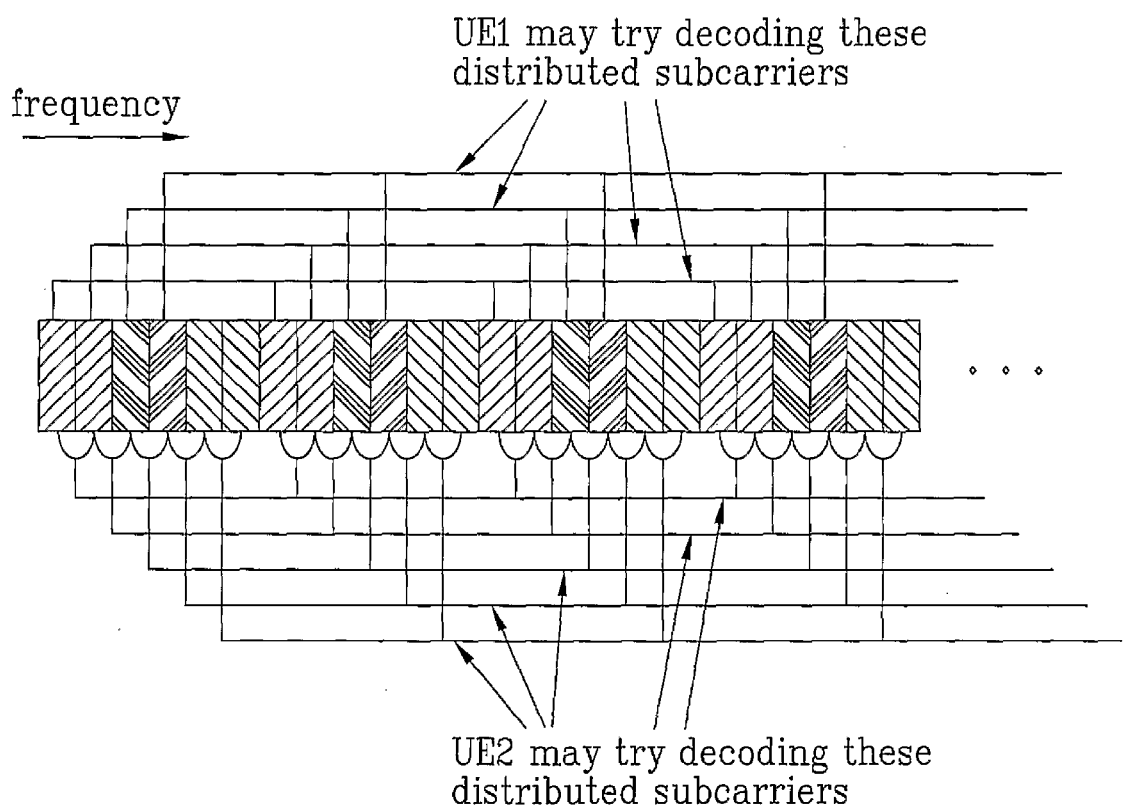

FIG. 8A and FIG. 8B are diagrams of examples that UEs having different scheduling information transmission formats designated thereto search for scheduling signals according to one embodiment of the present invention.

In particular, FIG. 8A and FIG. 8B show examples that two UEs, to which different scheduling information transmitting formats are designated, search scheduling signals by the above-explained schemes in case that scheduling signals are carried by subcarriers adjacent to a frequency axis for random symbols or in case that the scheduling signals are transmitted by a subcarrier unit by being distributed.

Referring to FIG. 8A, UE1 and UE2 assume scheduling information transmitting formats designated to themselves, respectively and then try scheduling signal receptions on possible time-frequency domains, respectively. In particular, the UE1 assumes a unit frequency domain indicated by one space in FIG. 8A and then tries a scheduling signal reception. And, the UE2 assumes a unit frequency domain indicated by two spaces in FIG. 8B and then tries a scheduling signal reception. In this case, the UE1 in the example shown in FIG. 8A can finish a scheduling signal search by reading a scheduling signal transmitted to itself in a fourth search.

In a method that a base station broadcasts a count of distributed allocation scheduling signals actually transmitted for each TTI according to one embodiment of the present invention, the above-explained operation can be supported in a manner of using a smallest time-frequency resource size used for transmission of distributed allocation scheduling signals as a unit size instead of using a count of distributed allocation scheduling signals and then notifying how many time-frequency resources amounting to prescribed unit sizes are used for the transmission of the distributed allocation scheduling signals.

In another method according to one embodiment of the present invention, it is able to reduce a burden imposed on a UE in scheduling signal reception in a manner of notifying a count of distributed allocation scheduling signals actually transmitted for each TTI to be discriminated per a scheduling signal having a different transmission format. In this case, a priority is designated in advance to a time-frequency domain allocation for scheduling signal transmission per a transmission format of scheduling information.

Figure 9:
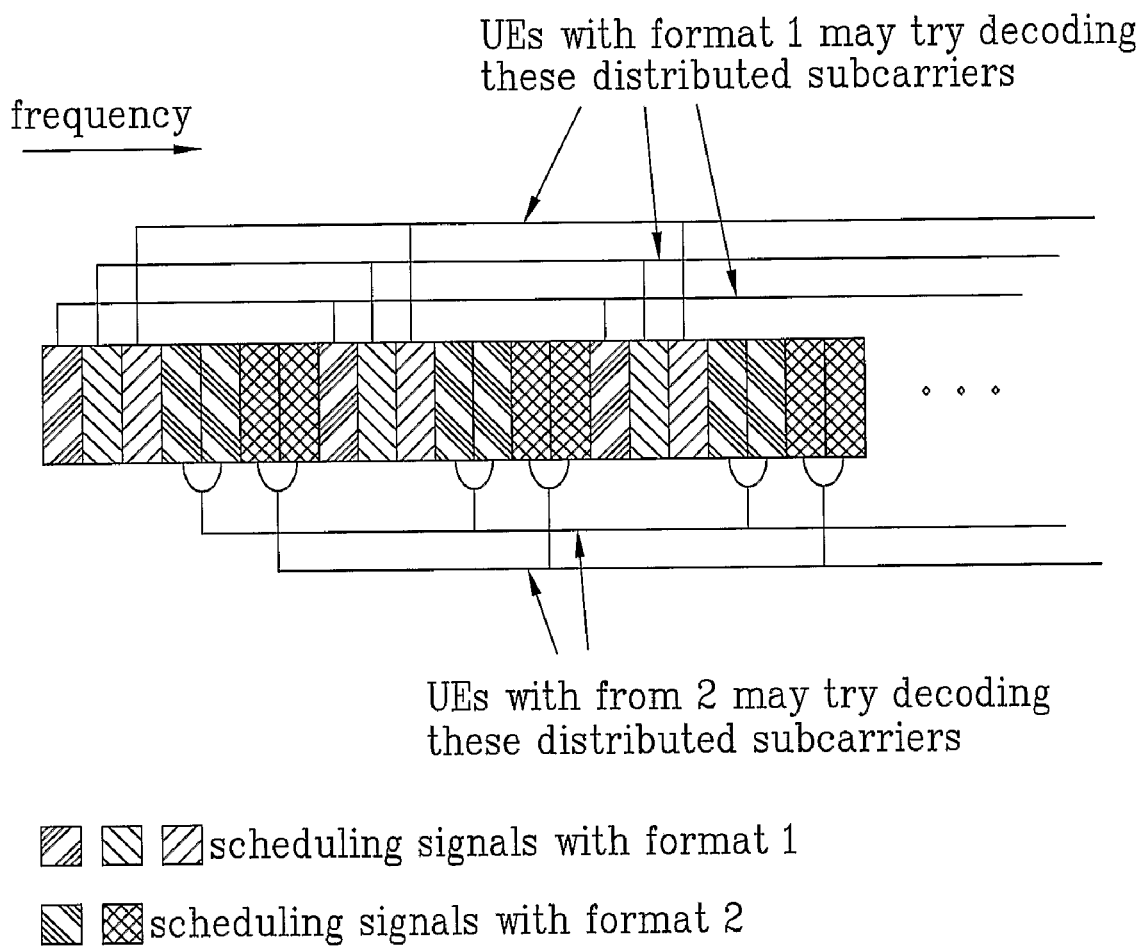
FIG. 9 is a diagram of an example that UEs having transmission formats designated thereto search for scheduling signals if different scheduling information transmission formats differ in priority.

FIG. 9 is a diagram of an example that UEs having transmission formats designated thereto search for scheduling signals if different scheduling information transmission formats differ in priority.

Referring to FIG. 9, there exist tow transmission formats, transmission format 1 and transmission format 2. And, a scheduling signal in the transmission format 1 has a priority to another scheduling signal in the transmission format 2 in time-frequency domain allocation. If so, FIG. 9 shows an example that three scheduling signals in the transmission format 1 and two scheduling signals in the transmission format 2 are transmitted.

When scheduling signals are regularly transmitted by the rule of the example shown in FIG. 9, if a UE knows the rule in advance and if a base station notifies how many scheduling signals are transmitted per the transmission format, the corresponding UE recognizes that a scheduling signal in the same transmission format designated to itself is carried by which time-frequency domain. So, the corresponding UE can try scheduling signal reception on the corresponding domain only.

INDUSTRIAL APPLICABILITY

Accordingly, a downlink control signal transmitting method according to one embodiment of the present invention can obtain both transmission efficiency by localized allocation and diversity gain of distributed allocation by considering advantages and disadvantages of the localized allocation and the distributed allocation.

Moreover, a downlink control signal transmitting structure using localized allocation and distributed allocation, a transmission signal by general distributed allocation is provided to a front portion of a single transmit time interval (TTI) and a transmission signal by localized allocation is provided to a rear portion of the corresponding TTI. Hence, the present invention elastically copes with a size of a control signal. And, an indicator for control information included in distributed allocation or the like is included in a portion by localized resource allocation, whereby reception efficiency can be raised.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting a downlink control signal by a base station, the method comprising:
   determining a transmission format among multiple transmission formats for the downlink control signal including scheduling information for a downlink data transmission, wherein a smallest time-frequency resource element is defined by one subcarrier in a frequency domain and one orthogonal frequency division multiplexing (OFDM) symbol in a time domain, wherein each of the multiple transmission formats is defined such that the downlink control signal is transmitted by a unit whose size corresponds to a multiplication of an integer value, differently determined for each of the multiple transmission formats, by a predetermined frequency domain size unit for transmitting the downlink control signal, wherein the predetermined frequency domain size unit used for transmitting the downlink control signal is predetermined to comprise a plurality of the smallest time-frequency resource elements arranged in the frequency domain at one OFDM symbol;
   transmitting the downlink control signal in accordance with the determined transmission format to each of a plurality of user equipment; and
   transmitting downlink data to each of the plurality of user equipment according to the scheduling information of the downlink control signal.

2. The method of claim 1, wherein the predetermined frequency domain size unit used for transmitting the downlink control signal comprises the plurality of the smallest time-frequency resource elements consecutively arranged in the frequency domain at one OFDM symbol.

3. The method of claim 1, wherein the predetermined frequency domain size unit used for transmitting the downlink control signal comprises the plurality of the smallest time-frequency resource elements distributively arranged in the frequency domain at one OFDM symbol.

4. The method of claim 1, wherein the predetermined frequency domain size unit used for transmitting the downlink control signal is a CCE (Control Channel Element) comprising a predetermined number of resource elements (REs).

5. The method of claim 4, wherein the multiple transmission formats comprise four formats,
wherein a first format of the four formats defines such that the downlink control signal is transmitted by a unit of 1 CCE,
a second format of the four formats defines such that the downlink control signal is transmitted by a unit of 2 CCEs,
a third format of the four formats defines such that the downlink control signal is transmitted by a unit of 4 CCEs and
a fourth format of the four formats defines such that the downlink control signal is transmitted by a unit of 8 CCEs.

6. The method of claim 1, wherein the scheduling information for the downlink data transmission comprises bitmap information in a unit of resource block group, wherein the resource block group comprises a predetermined number of resource blocks.

7. The method of claim 1, wherein the transmission format is determined according to a channel status for each of the plurality of user equipment.

8. A method of receiving a downlink control signal by a user equipment, the method comprising:
receiving, from a base station, the downlink control signal including scheduling information for a downlink data transmission;
trying to decode the downlink control signal in a unit whose size corresponds to an integer multiple selected from among predetermined multiple integer values, by a predetermined frequency domain size unit used for transmitting the downlink control signal, wherein the predetermined multiple integer values correspond to integer values of multiple downlink control signal transmission formats, wherein a smallest time-frequency resource element is defined by one subcarrier in a frequency domain and one orthogonal frequency division multiplexing (OFDM) symbol in a time domain, wherein the predetermined frequency domain size unit used for transmitting the downlink control signal is predetermined to comprise a plurality of the smallest time-frequency resource elements arranged in the frequency domain at one OFDM symbol; and
receiving downlink data from the base station according to the scheduling information of the downlink control signal.

9. The method of claim 8, wherein the predetermined frequency domain size unit used for transmitting the downlink control signal comprises the plurality of the smallest time-frequency of resource elements consecutively arranged in the frequency domain at one OFDM symbol.

10. The method of claim 8, wherein the predetermined frequency domain size unit used for transmitting the downlink control signal comprises the plurality of the smallest time-frequency resource elements distributively arranged in the frequency domain at one OFDM symbol.

11. The method of claim 8, wherein the predetermined frequency domain size unit used for transmitting the downlink control signal is a CCE (Control Channel Element) comprising a predetermined number of resource elements (REs).

12. The method of claim 11, wherein the user equipment tries to decode the downlink control signal in a unit of 1 CCE, 2 CCEs, 4 CCEs or 8 CCEs.

13. The method of claim 8, wherein the scheduling information for the downlink data transmission comprises bitmap information in a unit of resource block group, wherein the resource block group comprises a predetermined number of resource blocks.

* * * * *